US012746910B2

(12) United States Patent
Alarcon et al.

(10) Patent No.: US 12,746,910 B2
(45) Date of Patent: Sep. 29, 2026

(54) VEHICLE SYSTEMS FOR ENHANCING INGRESS AND/OR EGRESS EXPERIENCES FOR USERS

(71) Applicant: GM GLOBAL TECHNOLOGY OPERATIONS LLC, Detroit, MI (US)

(72) Inventors: Michael D. Alarcon, Markham (CA); Steffen Peter Lindenthal, Oshawa (CA); Alaa M. Khamis, Ontario (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 347 days.

(21) Appl. No.: 18/464,834

(22) Filed: Sep. 11, 2023

(65) Prior Publication Data

US 2025/0083662 A1 Mar. 13, 2025

(51) Int. Cl.
*B60W 30/06* (2006.01)
*B60W 50/14* (2020.01)
*B60W 50/16* (2020.01)
*G08G 1/14* (2006.01)

(52) U.S. Cl.
CPC ............ *B60W 30/06* (2013.01); *B60W 50/16* (2013.01); *G08G 1/142* (2013.01); *G08G 1/143* (2013.01); *G08G 1/145* (2013.01); *B60W 2050/143* (2013.01); *B60W 2050/146* (2013.01); *B60W 2540/227* (2020.02)

(58) Field of Classification Search
CPC ................. B60W 30/06; B60W 50/16; B60W 2540/227; B60W 2050/143; B60W 2050/146; G08G 1/142; G08G 1/143; G08G 1/145
USPC ....................................................... 340/932.2
See application file for complete search history.

(56) References Cited

U.S. PATENT DOCUMENTS 10,255,808 B2 * 4/2019 Bostick .................. G08G 1/143
2016/0358108 A1 * 12/2016 Sadovsky ............. G06Q 10/02
2021/0276541 A1 * 9/2021 Mujumdar ............ G08G 1/168

FOREIGN PATENT DOCUMENTS

DE 10 2013 012 891 B4 1/2018
DE 10 2018 113 883 A1 12/2018

* cited by examiner

*Primary Examiner* — Kam Wan Ma

(57) ABSTRACT

A vehicle system for assisting a user in a parking lot includes a detection module configured to receive data relating to the parking lot and a control module. The control module is configured to detect whether an available parking space is present in the parking lot based on the received data from the detection module, determine an amount of space required by the user to exit a vehicle, determine whether the available parking space provides sufficient space for the user based on the determined amount of required space, and in response to determining that the available parking space provides sufficient space for the user, optimize a parking bias of the vehicle relative to at least one boundary of the available parking space based on the amount of space required by the user. Other example vehicle systems and methods for assisting users in parking lots are also disclosed.

20 Claims, 12 Drawing Sheets

VEHICLE SYSTEMS FOR ENHANCING INGRESS AND/OR EGRESS EXPERIENCES FOR USERS

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle systems for enhancing ingress and/or egress experiences for users, such as users with mobility impairments.

Vehicles may include driver assistance systems to assist drivers in driving and parking functions. Driver assistance systems rely on sensors and cameras to provide such functionality.

SUMMARY

A vehicle system for assisting a user in a parking lot is disclosed. The vehicle system includes a detection module configured to receive data relating to the parking lot and a control module in communication with the detection module. The control module is configured to detect whether an available parking space is present in the parking lot based on the received data from the detection module, determine an amount of space required by the user to exit a vehicle, determine whether the available parking space provides sufficient space for the user based on the determined amount of required space, and in response to determining that the available parking space provides sufficient space for the user, optimize a parking bias of the vehicle relative to at least one boundary of the available parking space based on the amount of space required by the user.

In other features, the control module is configured to control the vehicle to enter the available parking space based on the parking bias of the vehicle relative to the at least one boundary of the available parking space.

In other features, the control module is configured to detect an occupancy of the user in the vehicle and optimize the parking bias of the vehicle relative to the at least one boundary of the available parking space based on the amount of space required by the user and the occupancy of the user.

In other features, the control module is configured to receive a minimum required dimension of a safe zone specific to the user and determine the amount of space required by the user based on the minimum required dimension.

In other features, the minimum required dimension of the safe zone is customizable based on at least one of a dimension of the vehicle, a modification of the vehicle, a user defined dimension, a suggested dimension, and a learned dimension of a user assistance device.

In other features, the control module is configured to detect whether a hazard is present adjacent to the available parking space based on the received data from the detection module and warn the user of the detected hazard.

In other features, the control module is configured to warn the user of the detected hazard by at least one of illuminating the detected hazard and displaying a warning on a display module for the detected hazard.

In other features, the control module is configured to activate a warning to the user in response to determining that the available parking space provides insufficient space for the user.

In other features, the warning is at least one of a visual warning, an audible warning, and a haptic warning.

In other features, the control module is configured to receive data indicative of a user-based rating of the parking lot and one or more characteristics of the parking lot and display on a display module the user-based rating and the one or more characteristics of the parking lot.

A vehicle system for assisting a user in a parking lot is disclosed. The vehicle system includes a detection module configured to receive data relating to the parking lot and a control module in communication with the detection module. The control module is configured to detect whether the user is approaching a vehicle parked in a parking space of the parking lot, determine an available space adjacent to the vehicle based on the received data from the detection module, determine an amount of space required by the user to enter the vehicle, compare the amount of space required by the user and the available space adjacent to the vehicle, and in response to the amount of space required by the user being less than the available space adjacent to the vehicle, illuminate an area adjacent to the vehicle to warn the user of an insufficient space to enter the vehicle.

In other features, in response to the amount of space required by the user greater than or equal to the available space adjacent to the vehicle, the control module is configured to detect whether a hazard is present adjacent to the vehicle based on the received data from the detection module and warn the user of the detected hazard.

In other features, the control module is configured to warn the user of the detected hazard by illuminating the detected hazard.

In other features, the control module is configured to receive a minimum required dimension of a safe zone specific to the user and determine the amount of space required by the user based on the minimum required dimension.

In other features, the minimum required dimension of the safe zone is customizable based on at least one of a dimension of the vehicle, a modification of the vehicle, a user defined dimension, a suggested dimension, and a learned dimension of a user assistance device.

A vehicle system for assisting a user in a parking lot is disclosed. The vehicle system includes a detection module configured to receive data relating to the parking lot and a control module in communication with the detection module. The control module is configured to determine an amount of space required by the user to enter or exit a first vehicle parked in a parking space of the parking lot, detect whether a second vehicle is entering the space required by the user to enter or exit the first vehicle, and in response to the second vehicle entering the space required by the user to enter or exit the first vehicle, visually warn a driver of the second vehicle of the space required by the user to enter or exit the first vehicle.

In other features, the control module is configured to visually warn the driver of the second vehicle by at least one of activating an exterior light of the first vehicle adjacent to the entering second vehicle and displaying a message on the ground between the first vehicle and the entering second vehicle.

In other features, the control module is configured to visually warn the driver of the second vehicle by illuminating in a first color an area on the ground corresponding to the space required by the user to enter or exit the first vehicle and displaying a first message on the illuminated area.

In other features, the control module is configured to determine whether the second vehicle has entered the space required by the user to enter or exit the first vehicle and in response to the second vehicle being in the space required by the user to enter or exit the first vehicle, illuminate the area on the ground in a second color different than the first color and display a second message on the illuminated area different than the first message.

In other features, the control module is configured to determine whether the second vehicle has entered the space required by the user to enter or exit the first vehicle and in response to the second vehicle not being in the space required by the user to enter or exit the first vehicle, display a message of gratitude on the ground.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicles may include driver assistance systems to assist drivers in driving and parking functions. For example, the driver assistance systems may assist the driver and/or enable autonomous control functions when entering and exiting a parking space. In such examples, the systems may detect objects, depict rear and front views of the vehicle, etc. when the vehicle is entering the parking space. While the driver assistance systems may actively assist in the actual parking of the vehicle, there is a need for assisting users (e.g., drivers and/or passengers with mobility impairments, etc.) in other parking related features. For example, such features include the ability to find available parking spaces that meets the needs of users, to provide vehicle assists in tight parking spaces (e.g., planned and in real-time), to prepare users to arrive at a final location, to protect users while entering and exiting the vehicle, etc.

The systems and methods according to the present disclosure provide technical solutions for assisting a vehicle user, such as a user with mobility impairments. Such user assistance includes, for example, identifying suitable parking spaces that provide space required to easily leave and enter a vehicle, creating a safe space or zone around the vehicle to allow the user to safely enter and leave a vehicle by allowing sufficient door opening space and highlighting potential hazards in the user's path, and communicating the extra space needs of the user with users of other approaching vehicles. Such user assistance features enhance the experience of users by allowing the users to safely leave and enter vehicles with ease.

Figure 1:
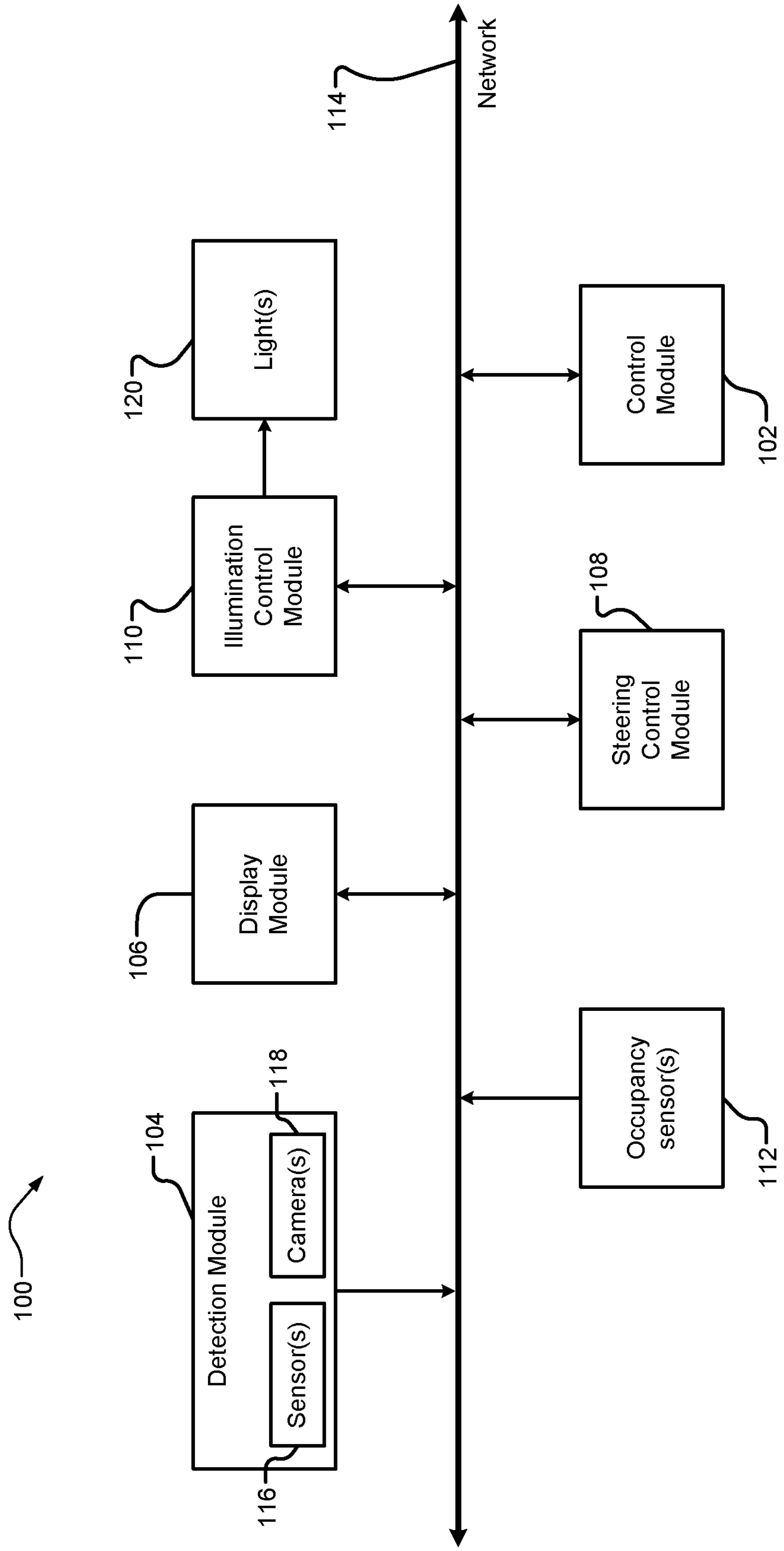
FIG. 1 is a functional block diagram of an example vehicle system for assisting a user in a parking lot, according to the present disclosure.

Referring now to FIG. 1, a block diagram of an example vehicle system 100 is presented for assisting a user in a parking lot. The vehicle system 100 of FIG. 1 may be employable in any suitable vehicle, such as an electric vehicle (e.g., a pure electric vehicle, a plug-in hybrid electric vehicle, etc.), an internal combustion engine vehicle, etc. Additionally, the vehicle system 100 may be applicable to an autonomous vehicle, a semi-autonomous vehicle, or a non-autonomous vehicle.

As shown in FIG. 1, the vehicle system 100 generally includes a control module 102, a detection module 104 in communication with the control module 102, and one or more optional modules and sensors in communication with the control module 102. For example, the optional modules may include a display module 106, a steering control module 108 and an illumination control module 110, and the optional sensors may include one or more occupancy sensors 112, as shown in the example of FIG. 1. Although FIG. 1 illustrates the vehicle system 100 as including specific modules and sensors, it should be appreciated that one or more other modules and/or sensors may be employed if desired. Additionally, while the vehicle system 100 is shown as including multiple separate modules (e.g., the control module 102, the steering control module 108, the illumination control module 110, etc.), any combination of the modules and/or the functionality thereof may be integrated into one or more modules.

The modules and sensors of the vehicle system 100 may share parameters via a network 114, such as a controller (or car) area network (CAN). In such examples, the parameters may be shared via one or more data buses of the network 114. As such, various parameters may be made available by a given module and/or sensor to other modules and/or sensors via the network 114.

In various embodiments, the detection module 104 may generally receive data relating to a parking lot in which the vehicle with the vehicle system 100 is traveling or parked. For example, the detection module 104 collects such data when the vehicle travels through and/or adjacent to the lot, when the vehicle is parked in the lot, etc. The collected data may be used by other modules, such as the control module 102 as further explained below. For instance, the collected data may be used to generate coarse-grain and/or fine-grain mapping. With such mapping, the control module 102 may be able to detect available parking spaces in the lot, determine dimensions of parking spaces, detect hazards in the lot, etc. Additionally, the collected data may be used to detect approaching vehicles, approaching users of the vehicle, etc.

The example of FIG. 1, the detection module 104 may include one or more detection devices. For example, the detection module 104 may include one or more sensors 116 and/or cameras 118 mounted on the exterior and/or interior of the vehicle. In such examples, the sensors may include any suitable type of sensor, such as radar sensors, lidar sensors, ultrasonic sensors, 3D sensors, etc. The sensors may be short-range sensors (e.g., short range radar (SRR) sensors, etc.) and/or long-range sensors (e.g., radar (LRR) sensors, etc.). In some examples, the cameras may include a front view camera, a rear view camera, a left view camera, and a right view camera (relative to the vehicle). With such detection devices, the detection module 104 may collect data to provide a virtual birds-eye view of the vehicle on the display module 106.

The steering control module 108 controls steering/turning of wheels of the vehicle, for example, based on a driver turning a steering wheel within the vehicle and/or steering commands from one or more vehicle control modules. For example, the steering control module 108 may autonomously and/or semi autonomously control turning of the vehicle's wheels based on one or more signals from the control module 102 and/or other sensors. In some examples, a steering wheel angle (SWA) sensor may monitor a rotational position, movement, etc. of the steering wheel and generate a SWA signal based on the position, movement, etc. of the steering wheel. The generated SWA signal is then provided to the steering control module 108 and/or the control module 102.

In FIG. 1, the display module 106 may display, among other things, a representation of the data collected by the detection module 104 (e.g., the virtual birds-eye view of the vehicle, hazards, notifications, etc.), warnings to notify one or more users (e.g., drivers and/or passengers) of detected hazards, insufficient accessibility space, etc. as further explained below. In various embodiments, the display module 106 may include a user interactive display of an entertainment center adjacent to the driver, a user device (e.g., a cell phone, tablet, etc.) in communication with the control module 102 in the vehicle (via the network 114), etc.

The illumination control module 110 controls illumination of one or more lights 120. For example, the lights 120 may be controlled to flash, change colors, display messages on the ground, project a light carpet on the ground, etc. In such examples, the lights 120 may effectively warn and/or notify the users of the vehicle of detected hazards, insufficient accessibility space, sufficient accessibility space and/or drivers of other vehicles of particular needs of the users associated with the vehicle. In some examples, the one or more lights 120 each may include a single controllable LED (or another suitable light source) or a collection of controllable LEDs (or other suitable light sources).

The occupancy sensors 112 are used to detect an occupancy of users in the vehicle. The occupancy sensors 112 may include an interior camera, a radar sensor, a seat pressure sensor, a door opening sensor, etc. In such examples, any one of the sensors may receive data indicative of a user being located in a particular area, seat, etc. of the vehicle. For example, a seat pressure sensor in the driver seat may indicate that a driver is sitting on that seat. Additionally, a camera (e.g., positioned in the steering column, the user interactive display, etc.) may indicate the presence of a driver in the driver seat and passengers in the front and rear passenger seats.

In various embodiments, the vehicle system 100 of FIG. 1 may be applicable in assisting users in exiting and/or entering the vehicle. For example, the control module 102 may determine an amount of space required by a particular user to exit and/or enter the vehicle. This space defines a safe zone around at least a portion of the vehicle that allows the user to safely and easily exit and/or enter the vehicle. In such examples, the amount of required space may be determined based on a minimum required dimension specific to the user, safety margins/distances to other vehicles (e.g., to the right and left of the vehicle), etc. The minimum required dimension and/or the safety margins/distances may be received by the control module 102 (e.g., user defined widths) and/or determined by the control module 102.

For example, the control module 102 may determine the minimum required dimension based on various parameters. For instance, the minimum required dimension may be determined based on dimensions of the vehicle, including factory dimensions and/or dimensions for modified features of the vehicle. Such information may be input and stored in a memory circuit associated with the vehicle system 100. For example, if the vehicle is modified to include a ramp, a wing door, etc. to accommodate users with mobility impairments, dimensions for the modified features may be provided (e.g., by the user, a technician installing the features, etc.).

Additionally, the minimum required dimension may be determined based on user defined dimensions. For example, a user of the vehicle may provide additional space requirements beyond the factory and/or modified vehicle dimensions. In such examples, the user may prefer an additional buffer (e.g., two feet, three feet, etc.) to allow the user to easily exit and/or enter the vehicle.

In some examples, the minimum required dimension may be determined based on suggested dimensions. For example, if the user employs a user assistance device (e.g., a wheelchair, a walker, a ramp, a lift, etc.), characteristics (e.g., a width, a turning radius, etc.) of the device may be known by or provided to the control module 102. In such examples, the control module 102 may suggest dimensions to allow sufficient space for the user to safely operate the user assistance device when entering and/or exiting the vehicle.

Further, the control module 102 may determine the minimum required dimension based on learned dimensions of the user assistance device. In such examples, the control module 102 may receive data relating to the user assistance device, such as data from the detection module 104, an external source (e.g., a server in communication with the system 100), etc. representing characteristics (e.g., a width, a turning radius, etc.) of the device. In other examples, the control module 102 may detect a particular model of the user assistance device (e.g., based on data from the detection module 104, user input, etc.) and retrieve characteristics from an external source to learn dimensions of the user assistance device.

In various embodiments, the control module 102 detects whether an available parking space is present in the parking lot. This may be applicable when the system 100 assists users in exiting the vehicle. For example, the control module 102 may utilize data received from the detection module 104 to detect available parking spaces. Such detection may be accomplished through coarse-grain mapping which provides a high-level perspective of the parking lot.

Then, the control module 102 determines whether the detected available parking space provides sufficient space for the user. For example, once a parking space is identified, the control module 102 can determine a width, a length, etc. of the space through, for example, coarse-grain mapping. For instance, based on data received from the detection module 104, the control module 102 may identify boundaries (e.g., left and right boundary lines) of a space and then calculate the width, the length, etc. of the space. Additionally, the control module 102 may factor in, based on data received from the detection module 104, adjacent parking spaces and whether vehicles (if any) in the spaces are near adjoining boundaries of the identified available parking space. With such information about the identified parking space and its surroundings, the control module 102 can determine an available space (e.g., a width) adjacent to the vehicle when the vehicle is parked in the parking space. Then, the control module 102 may compare that available space to the user's required space to determine whether the detected available parking space provides sufficient space for the user.

Next, the control module 102 determines and optimizes a parking bias of the vehicle relative to a boundary of the available parking space if the available parking space provides sufficient space for the user. In doing so, the control module 102 determines an optimal position of the vehicle when the vehicle is inside the parking space. For example, a user exiting from a rear passenger side door (e.g., via a ramp) is better assisted if the vehicle is positioned closer to a driver side boundary of the parking space.

In making such determinations, the control module 102 may take in account the determined amount of space required by the user, the available space near the vehicle, the location of the user in the vehicle, etc. For example, the control module 102 may detect an occupancy of the user in the vehicle based on data from the one or more occupancy sensors 112. In doing so, the control module 102 may generate an occupancy map identifying locations (e.g., seats) in the vehicle being occupied by individuals. Then, the control module 102 may optimize the parking bias relative to a boundary of the available parking space based on the location of the individuals. For example, a user occupying the driver seat and planning to exit the driver door is better assisted (e.g., provided more space) if the vehicle is positioned closer to a passenger side boundary of the parking space.

Then, the control module 102 may control the vehicle to enter the available parking space based on the determined parking bias. For example, once the parking bias is determined, the control module 102 may transmit a control signal to the steering control module 108. In turn, the steering control module 108 may autonomously and/or semi autonomously control turning of the wheels based on the control signal to direct the vehicle towards its optimal position in the parking space. In such examples, additional autonomous control (e.g., accelerating, braking, etc.) may be based on data from the detection module 104. In other examples, the control module 102 may notify the driver of the optimal position in the parking space based on the determined parking bias via the display module 106. In turn, the driver may manually control the vehicle to enter the available parking space based on the parking bias.

In various embodiments, the users in the vehicle may be warned of possible issues and/or hazards when parking the vehicle and/or exiting the vehicle. For example, the control module 102 may activate a warning to the user in response to determining that the available parking space provides insufficient space for the user. For example, the control module 102 may activate an audible alert indicating insufficient space through one or more vehicle speakers. Additionally and/or alternatively, the control module 102 may activate a haptic alert that the driver can sense. For example, the steering wheel or the driver seat may vibrate to indicate insufficient space. Further, the control module 102 may activate a visual alert to notify the driver. The visual alert may include, for example, flashing of interior and/or exterior lights, displaying an alert on the display module 106, etc. For instance, the display module 106 may show a red, flashing area along a side of the vehicle (e.g., in the birds-eye view, etc.).

Figure 2:
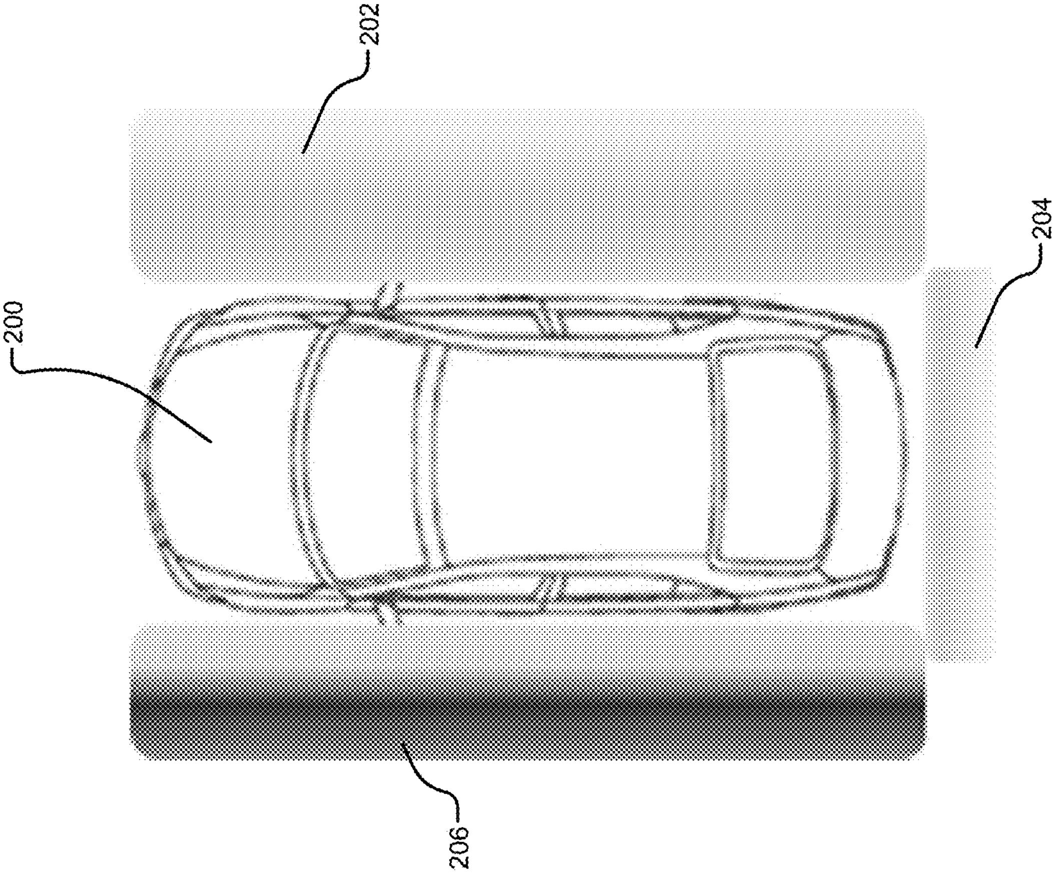
FIG. 2 is a birds-eye view of a vehicle having different visual indicators around the vehicle signifying sufficient or insufficient space for a user, according to the present disclosure.

For example, FIG. 2 depicts a birds-eye view of a vehicle 200 having various visual indicators around the vehicle 200. In the example of FIG. 2, the areas to the right and behind of the vehicle are clear (e.g., have sufficient space) as shown by visual indicators 202, 204. However, the area to the left of the vehicle has insufficient space for the user as shown by a visual indicator 206. In such examples, the visual indicators 202, 204 may be shown in green indicating the sufficient space for the user, and the indicator 206 may be shown in red indicating the insufficient space for the user.

With continued reference to FIG. 1, the control module 102 may activate a warning when a hazard is present adjacent to the available parking space. For instance, the control module 102 may utilize data received from the detection module 104 to detect a hazard adjacent to the available parking space. This hazard detection may be accomplished through fine-grain mapping which provides a detailed-level perspective of the parking lot. More specifically, the control module 102 may locate and identify a particular hazard (e.g., an obstacle such as a pothole, a crack, a bump, a puddle, an object on the ground, etc.) within and/or adjacent to the parking space through fine-grain mapping. Then, the control module 102 warns the user of the detected hazard through one or more visual warnings, audible warnings, etc.

Figure 3:
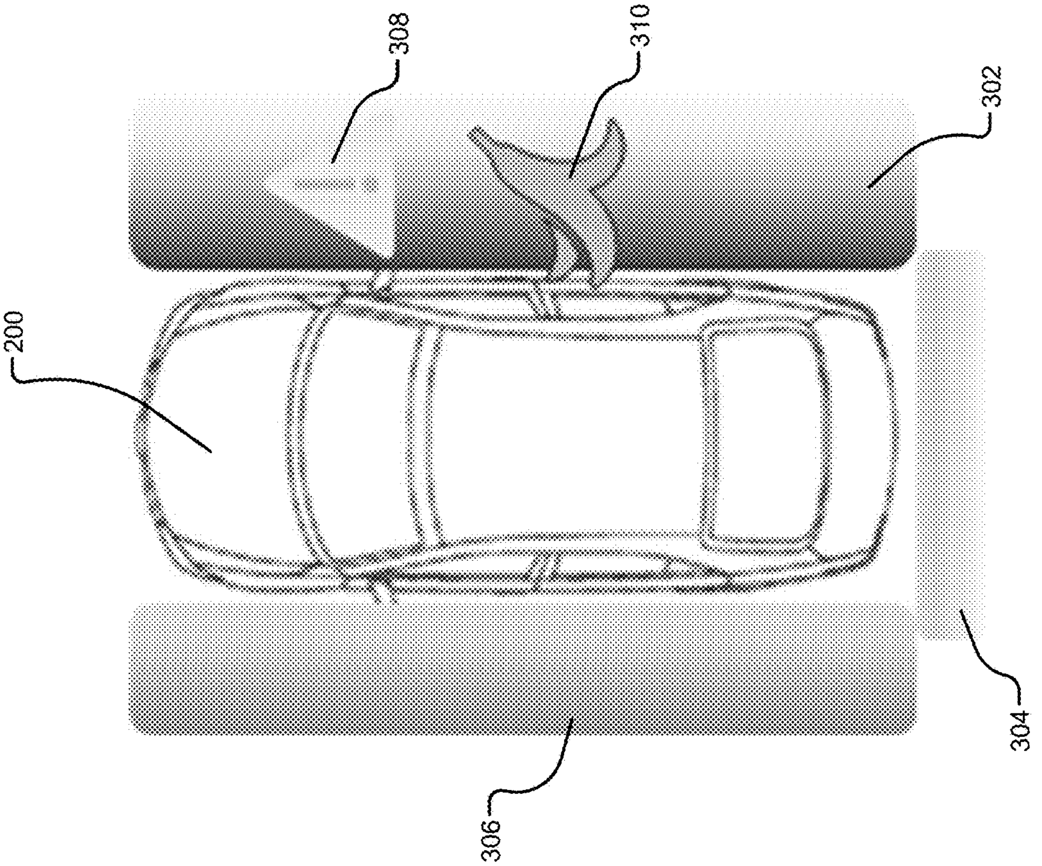
FIG. 3 is a birds-eye view of a vehicle having different visual indicators around the vehicle signifying sufficient or insufficient space and detected hazards for a user, according to the present disclosure.

The control module 102 may warn the user of the detected hazard by displaying a warning on the display module 106 for the detected hazard. For example, FIG. 3 depicts a birds-eye view of the vehicle 200 having visual indicators around the vehicle 200. In FIG. 3, the areas to the left and behind of the vehicle are clear (e.g., have sufficient space and no detected hazards) as shown by visual indicators 304, 306. However, the area to the right of the vehicle is shown as having a detected hazard, as provided by visual indicators 302, 308, 310. In such examples, the visual indicator 302 may be shown in red, the visual indicator 308 depicts a virtual hazard sign, and the visual indicator 310 identifies the hazard (e.g., a virtual banana peel).

In other examples, the control module 102 of FIG. 1 may additionally and/or alternatively warn the user of the detected hazard by illuminating the detected hazard. For example, once the hazard is detected, the control module 102 may transmit a control signal to the illumination control module 110 causing the one or more lights 120 to illuminate (e.g., spotlight, highlight, etc.) the detected hazard.

In various embodiments, users may be notified of various characteristics and/or ratings associated with different parking lots. Such information may be used by the users in planning where to park. For example, the control module 102 may receive data indicative of user-based ratings of parking lots and one or more characteristics of the parking lots. In such examples, the data may be provided from an external database which stores feedback from other users. Then, the control module 102 may display (e.g., on the display module 106 such as a user interactive display in the vehicle, a user device, etc.) the user-based ratings and the characteristics of the parking lots. With this information, the driver and/or another user in the vehicle can determine which parking lots are most suitable. For example, the information may indicate whether a parking lot is big enough, wheelchair friendly (e.g., has a wheelchair ramp, no curb sides, etc.), hazard free (e.g., no potholes, mud, banana peels, etc.), close to a wheelchair friendly washroom, close to an elevator in a building, etc.

Figure 4:
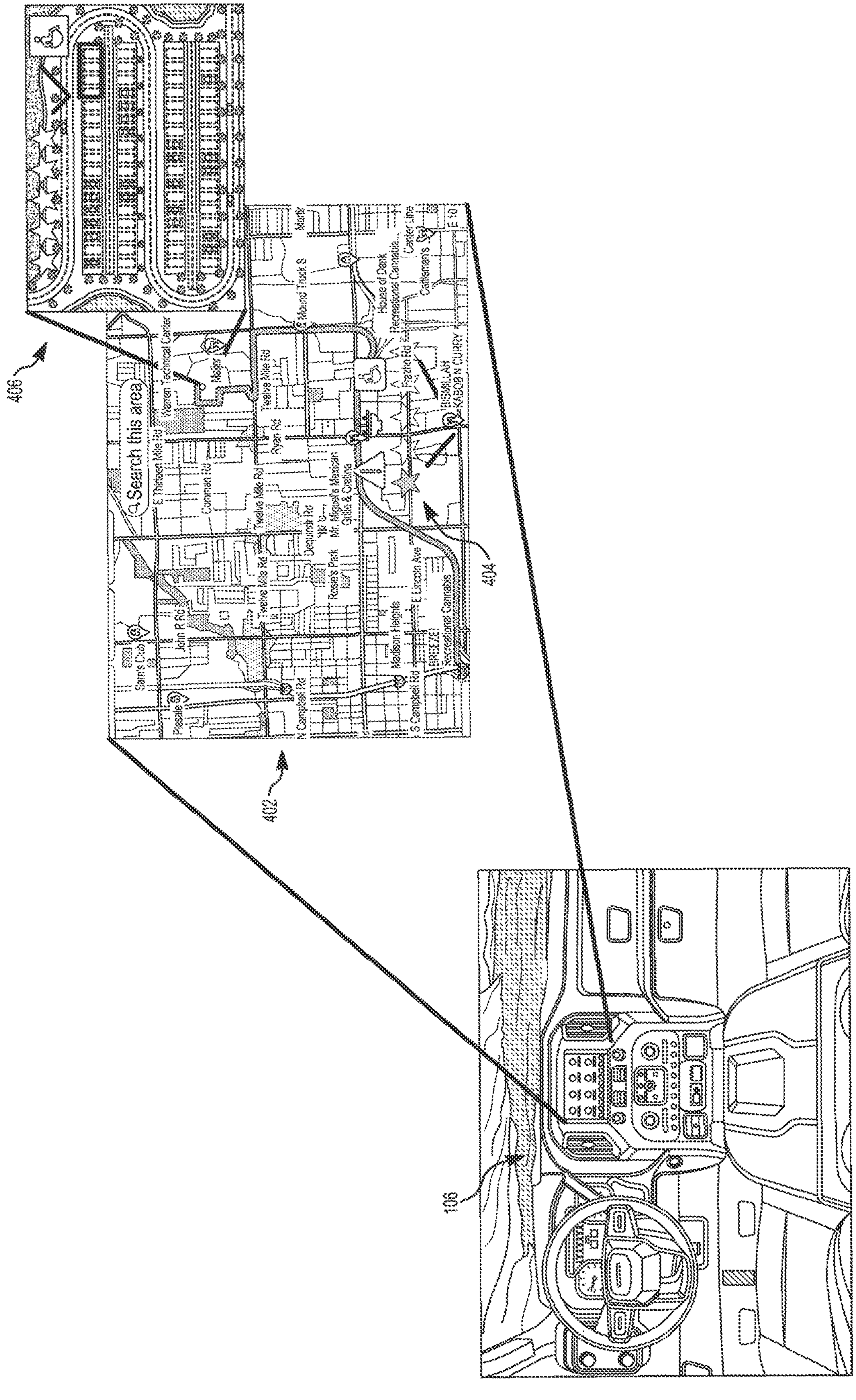
FIG. 4 is a view of a display module showing a map with visual projections of user-based ratings of different parking lots, according to the present disclosure.

For example, FIG. 4 depicts an example view of the display module 106, and more specifically a user interactive display in the vehicle. As shown, the display module 106 depicts a map 402 including visual projections 404, 406 of user-based ratings of different parking lots. Specifically, the parking lot associated with the projection 404 received a one-star rating while the parking lot associated with the projection 406 received a five-star rating. Additionally, while not shown in FIG. 4, the map 402 may also display messages of characteristics of the parking lots. For example, a message associated with the projection 404 may indicate that the parking lot is two feet too narrow for the user's vehicle and does not have a suitable washroom nearby. In other examples, a message associated with the projection 406 may indicate that the parking lot is big, has no curbs, and has a washroom nearby.

As referenced above, the vehicle system 100 of FIG. 1 may be applicable in assisting users in entering their parked vehicle(s). In doing so, the vehicle system 100 may generally notify a user approaching vehicle of sufficient/insufficient space to enter the vehicle, possible hazards around the vehicle, etc. For example, the control module 102 may detect whether the user is approaching the vehicle parked a parking space of the parking lot. When the user approaches the vehicle (e.g., is within a defined distance), the control module 102 may receive a signal indicating a key fob, a user's phone, etc. is nearby. Once the approaching user is detected, the control module 102 may determine the amount of space required by the user and the available space adjacent to the vehicle, as explained above. Then, the control module 102 compares the required space and the available space to determined whether sufficient space is available for the user to enter the vehicle.

If sufficient space is not available, the control module 102 warns the user of an insufficient amount of space to enter the vehicle. For example, if the comparison indicates the amount of space required by the user is less than the available space adjacent to the vehicle, the control module 102 may transmit a control signal to the illumination control module 110 thereby causing the one or more lights 120 to illuminate (e.g., spotlight, highlight, etc.) an area adjacent to the vehicle. In such examples, the one or more lights 120 may be controlled to illuminate the area in red, flash, etc.

If, however, sufficient space is available, the control module 102 may provide a notification to the user to enter the vehicle. For instance, if the comparison indicates the amount of space required by the user greater than or equal the available space adjacent to the vehicle, the control module 102 may transmit a control signal to the illumination control module 110 thereby causing the one or more lights 120 to illuminate (e.g., spotlight, highlight, etc.) an area adjacent to the vehicle in green.

Additionally, in some examples, the approaching user may be warned of hazards near the vehicle. For example, and as explained above, the control module 102 may utilize data received from the detection module 104 to detect a hazard adjacent to the available parking space. Then, the control module 102 can warn the approaching user of the detected hazard by illuminating the hazard (e.g., through control of the lights 120, etc.), illuminating an area adjacent to the vehicle, etc. as explained above.

In other embodiments, the vehicle system 100 communicates with users from other vehicles to make them aware of extra space needs of users of the parked vehicle. For example, the control module 102 may determine the amount of required space (e.g., the safe space or zone around the vehicle) for the user to enter and/or exit the vehicle as explained above. Then, the control module 102 may detect whether an approaching adjacent vehicle is entering the required space. For instance, the control module 102 may constantly or periodically monitor the area adjacent to the parked vehicle (e.g., based on data from the detection module 104) to detect the approaching vehicle and its location relative to the parked vehicle, and then determine whether the approaching vehicle is intruding into the required space. If so, the control module 102 may visually warn a driver of the approaching vehicle of the space required by the user to enter or exit the parked vehicle.

Figure 5:
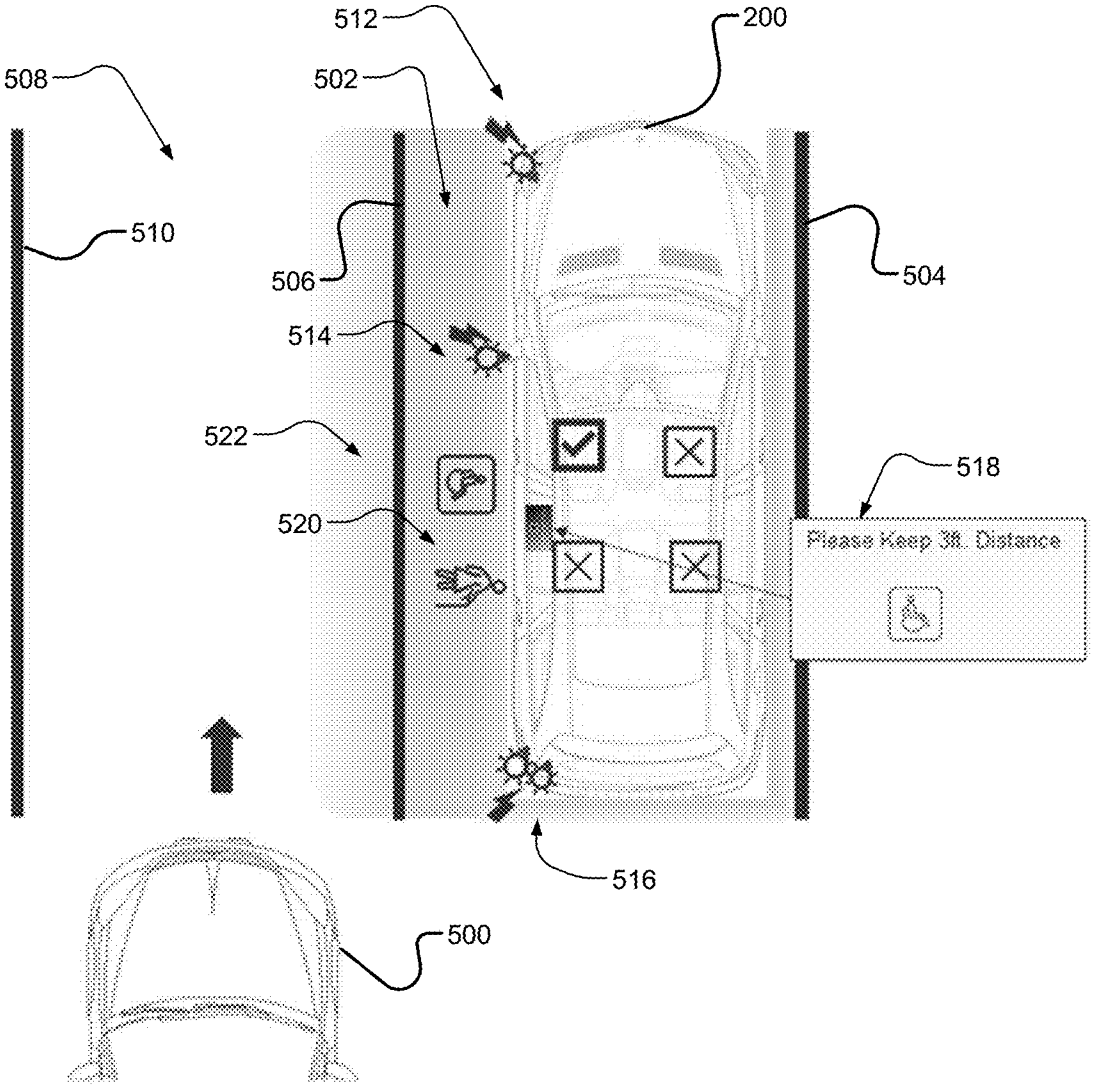
FIG. 5 depicts a birds-eye view of a parked vehicle and another vehicle entering an adjacent parking space, in which various optional visually indicators are provided to notify a driver of the approaching vehicle that a user of the parked vehicle requires additional space to enter or exit the vehicle, according to the present disclosure.

For example, FIGS. 5-8 depict a birds-eye view of the vehicle 200 and another vehicle 500, in which various visually warnings and/or notification are provided to the driver to the vehicle 500. In FIG. 5, the vehicle 200 is parked in a space 502 at least partially defined by boundaries 504, 506, and the vehicle 500 is approaching an adjacent space 508 at least partially defined by the boundary 506 and a boundary 510. In such examples, once the approaching vehicle 500 is detected, the control module 102 of FIG. 1 visually warns the driver of the vehicle 500 that a user of the vehicle 200 requires additional space to enter or exit the vehicle 200. For example, the control module 102 may activate exterior lights (e.g., the lights 120 of FIG. 1) adjacent to the entering vehicle 500, as shown by light indicators 512, 514, 516, and/or display a message, a symbol, etc. on the ground between the vehicles 200, 500, as shown by a projected message 518 and projected symbols 520. Additionally, in some examples, the control module 102 of FIG. 1 may activate the exterior lights to highlight the required space as indicated by the shaded area 522. In the example of FIG. 5, the highlighted area may indicate (e.g., in green) that the approaching vehicle 500 is not within the required space.

Figure 6:
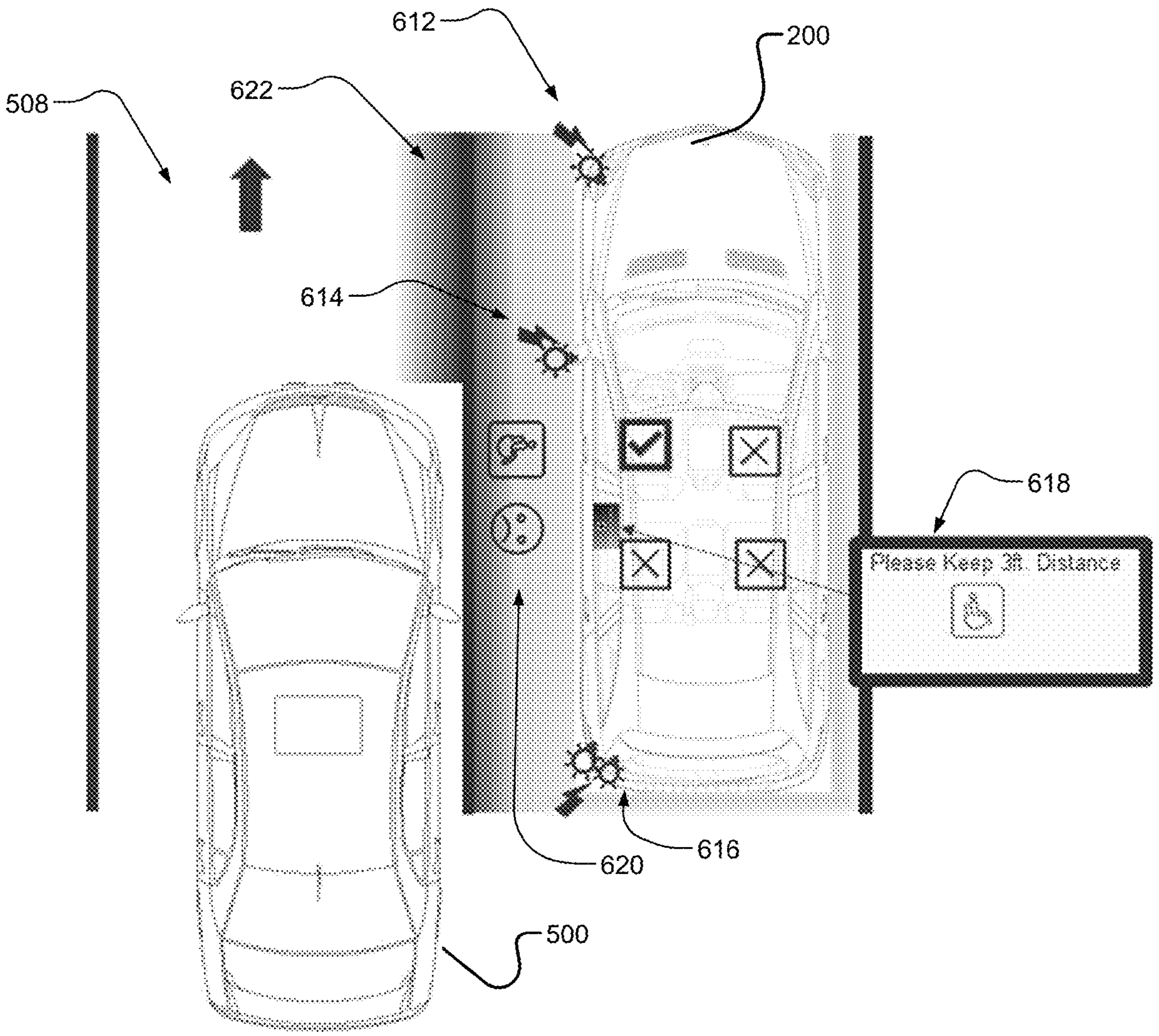
FIG. 6 depicts a birds-eye view of the parked vehicle and the approaching vehicle of FIG. 5, in which the approaching vehicle is intruding into the required additional space for the user of the parked vehicle and various optional visually indicators are provided to notify the driver of the intrusion, according to the present disclosure.
Figure 7:
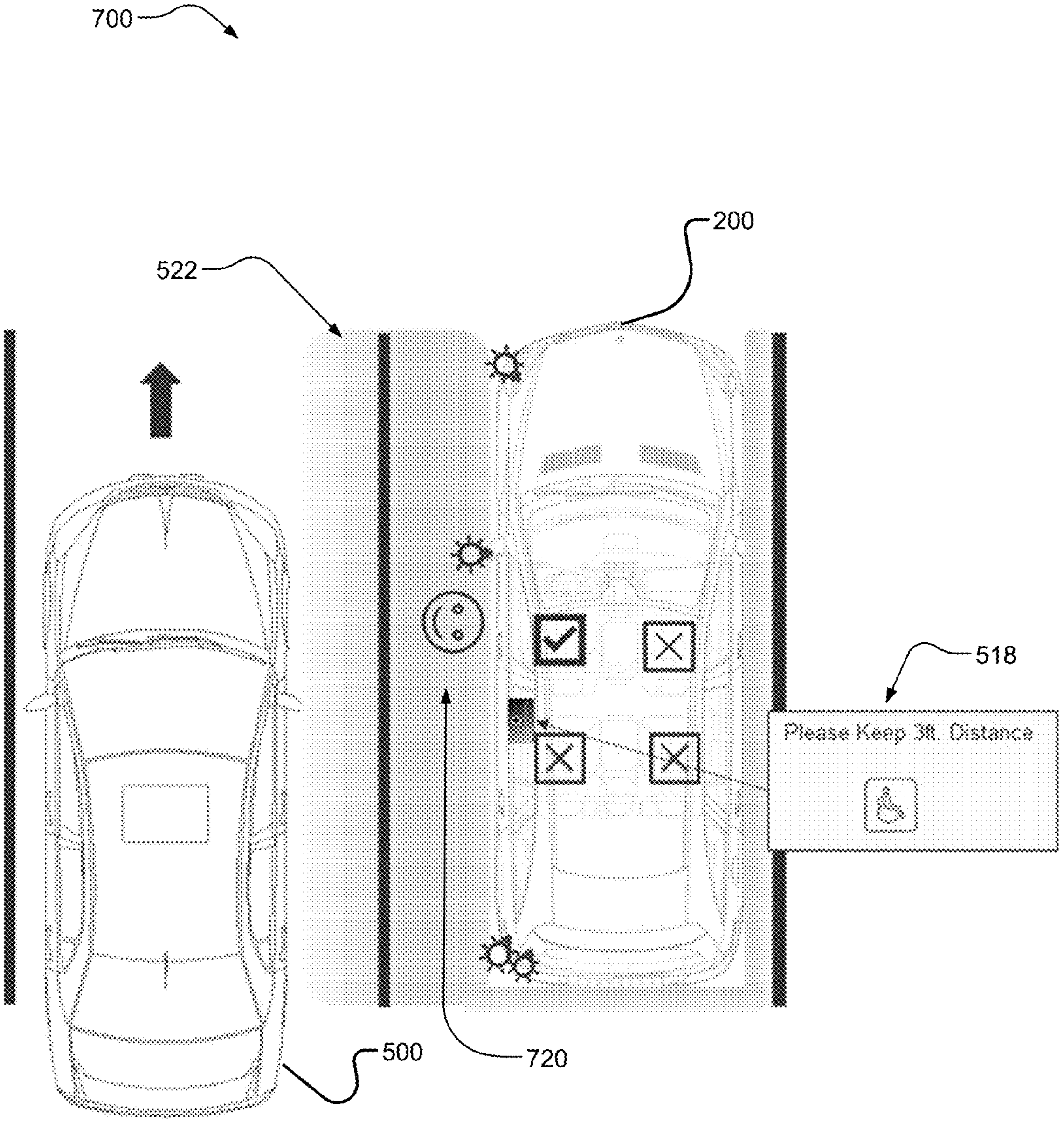
FIG. 7 depicts a birds-eye view of the parked vehicle and the approaching vehicle of FIG. 6, in which the driver of the approaching vehicle has altered the course of the vehicle to avoid the required additional space for the user of the parked vehicle and various optional visually indicators are provided to notify the driver that sufficient space is being provided, according to the present disclosure.

However, in FIG. 6, the vehicle 500 is entering the adjacent space 508 and intruding into the required space for the user of the parked vehicle 200. In this example, the control module 102 of FIG. 1 may control the exterior lights (e.g., as shown by light indicators 612, 614, 616) to flash and shine at a higher intensity than in FIG. 5. Additionally, the control module 102 may display a stronger, more intense message 618 (e.g., highlighted, modified color, etc.) than in FIG. 5. Further, the control module 102 may project different symbols 620 (e.g., a frowny face, etc.) and highlight the required space in a different color (as indicated by the shaded area 622) than in FIG. 5.

If the driver alters the course of the vehicle 500 to avoid the required space for the user of the parked vehicle 200, the control module 102 of FIG. 1 may again alter the messaging towards the driver. For example, in FIG. 7, the vehicle 500 is no longer in the required space. In such examples, the control module 102 of FIG. 1 may provide a different symbol 720 (e.g., a smiley face) and revert back to projecting the message 518 and shaded area 522 of FIG. 5. Additionally, in some examples, the control module 102 may control the exterior lights to stop flashing.

Figure 8:
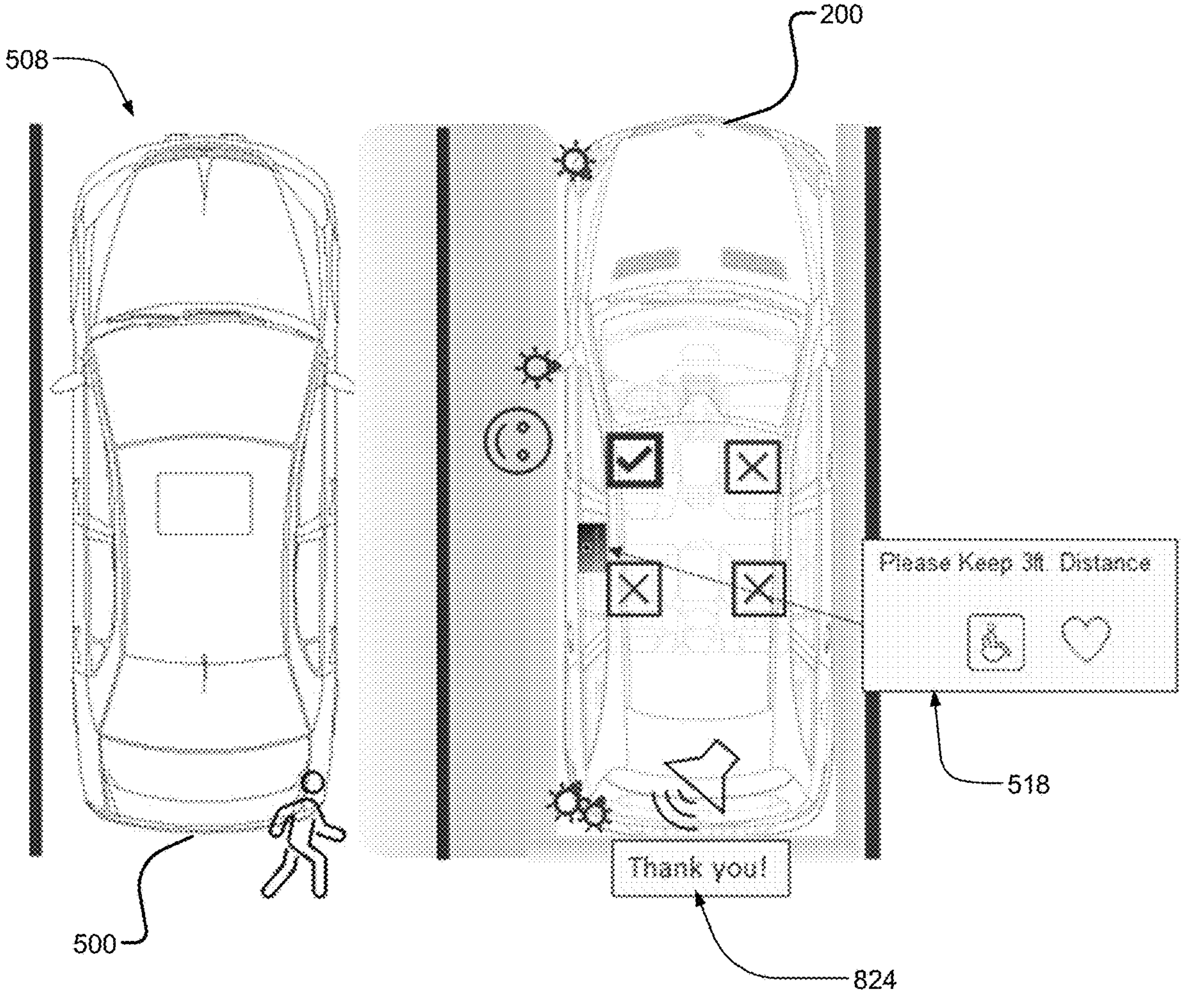
FIG. 8 depicts a birds-eye view of the vehicles of FIG. 7, in which the approaching vehicle is now parked in the adjacent parking space and various optional visually indicators including a message of gratitude are provided to the driver of the vehicle parked in the adjacent parking space, according to the present disclosure.

Then, once the vehicle 500 is parked, the control module 102 of FIG. 1 may yet again alter the messaging towards the driver. For example, in FIG. 8, the vehicle 500 is shown as being parked in the space 508 with the driver walking away. In such examples, the control module 102 of FIG. 1 may project (e.g., via the lights 120 of FIG. 1) a message of gratitude on the ground as shown by indicator 824. In such examples, the message may read "Thank you!" as shown in FIG. 8 or another suitable message. The control module 102 may also display the message 518 of FIG. 5 but with an additional heart emoji. In other examples, the exterior lights may project with another different color and/or speakers of the vehicle 200 may be controlled to output an audible message of gratitude if desired.

FIGS. 9-13 illustrate example control processes 900, 1000, 1100, 1200, 1300 employable by the vehicle system 100 of FIG. 1 for assisting a user in a parking lot. Although the example control processes 900, 1000, 1100, 1200, 1300 are described in relation to the vehicle system of FIG. 1 including the control module 102, any one of the control processes 900, 1000, 1100, 1200, 1300 may be employable by any suitable system.

Figure 9:
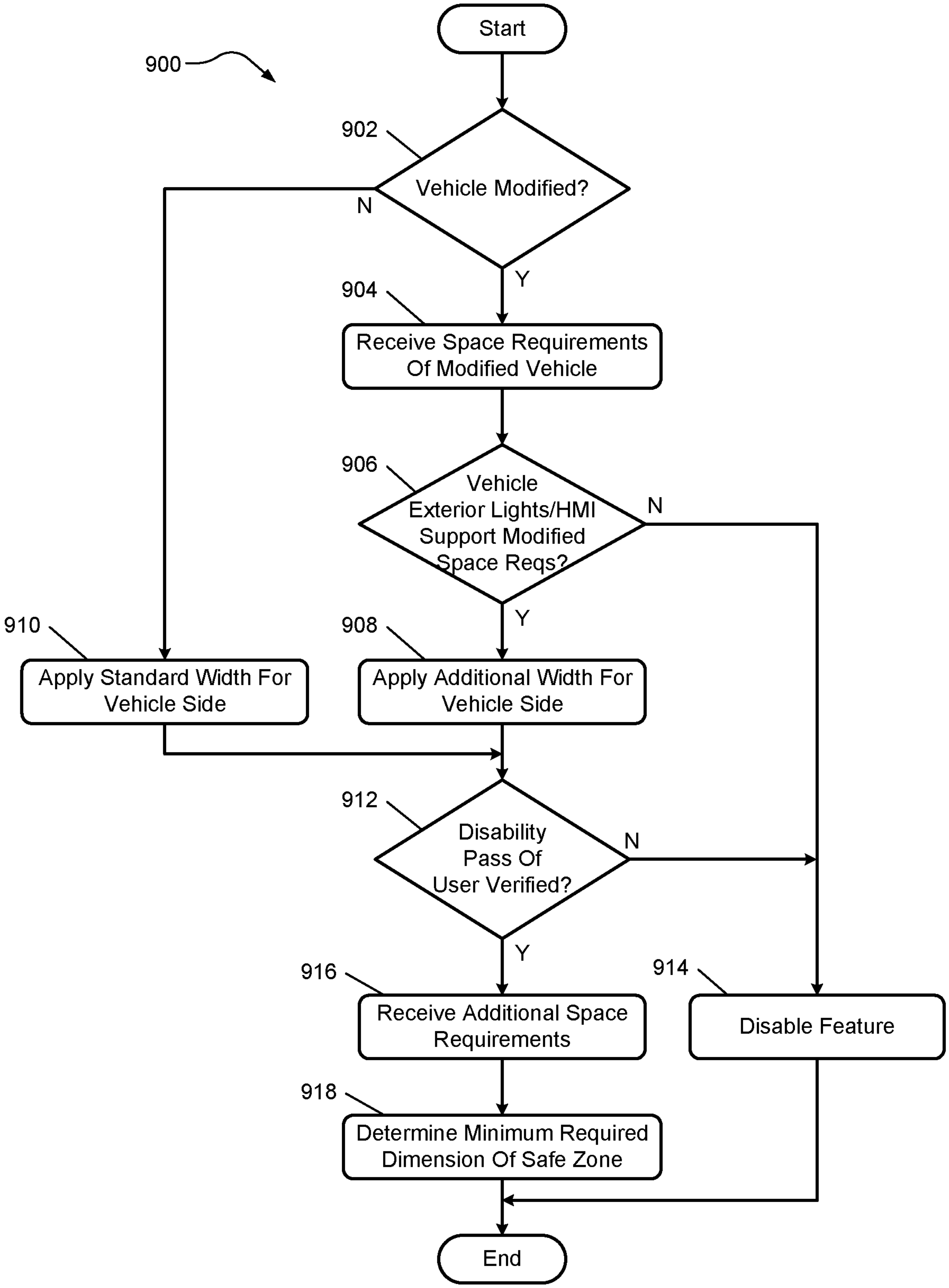
FIG. 9 is a flowchart of an example control process for determining a minimum required dimension of a safe zone specific to a user, according to the present disclosure.

In FIG. 9, the control process 900 is employable to determine a minimum required dimension of a required space or safe zone specific to a user. As shown in FIG. 9, the control process 900 begins at 902 where a determination is made as to whether the vehicle is modified. This determination may be made based on an input provided to the control module 102 and/or another suitable module, the control module 102 detecting a modification in the vehicle (e.g., based on one or more vehicle sensors), etc. If no, control proceeds to 910 where the control module 102 applies a default (e.g., a standard) width associated with the unmodified vehicle in determining the minimum required dimension. Control then proceeds to 912. If, however, the vehicle has been modified, control proceeds to 904.

At 904, the control module 102 receives space requirements associated with the modified vehicle. For example, if the vehicle is modified (e.g., to include an aftermarket ramp, wing door, etc.), a user, a technician installing the features, etc. may provide the dimensions of the modified features as explained above. In such examples, the control module 102 may determine space requirements based on the dimensions. In other examples, the user, the technician, etc. may provide the space requirements for the modified features. Control then proceeds to 906.

At 906, the control module 102 determines whether the vehicle has exterior lights and a human machine interface (HMI) that supports the space requirements of the modified features. For example, a light carpet and/or other exterior lighting features of the vehicle are limited to a maximum display area (e.g., for highlighting the safe zone). If the modified features have space requirements that exceed the maximum display area associated with the light carpet, the HMI, etc., then such notification features would be ineffective for the modified vehicle. If no at 906, control proceeds to 914 where the control module 102 disables an accessibility assistance feature for the vehicle. If, however, the exterior lights, the HMI, etc. do support the space requirements of the modified features, control proceeds to 908 where the control module 102 applies an additional width associated with the space requirements for the modified vehicle in determining the minimum required dimension. Control then proceeds to 912.

At 912, the control module 102 verifies that the user has a disability pass. For example, the control module 102 may verify whether the user has a disability pass by requiring the user to enter an identification number associated with the pass (e.g., a handicap placard, etc.) and then comparing that number to identification numbers for known disability passes (e.g., stored in an external database). In other examples, the user may provide an input the control module 102, such as an affirmative input in response to a displayed request. If the disability pass is verified, control proceeds to 916. If not, control proceeds to 914 where the control module 102 disables the accessibility assistance feature for the vehicle.

At 916, the control module 102 may receive additional space requirements specific to the user for the vehicle. For example, the user may provide additional space requirements beyond the factory and/or modified vehicle dimensions. In such examples, the user may prefer an additional buffer to allow the user to easily exit and/or enter the vehicle. In other examples, the additional space requirements may be suggested by the control module 102 as explained herein. Control then proceeds to 918.

At 918, the control module 102 determines the minimum required dimension of a required space or safe zone specific to the user. The determination may be made based on the applicable width associated with the vehicle (or modified vehicle), any additional space requirements, etc. Control then ends.

Figure 10:
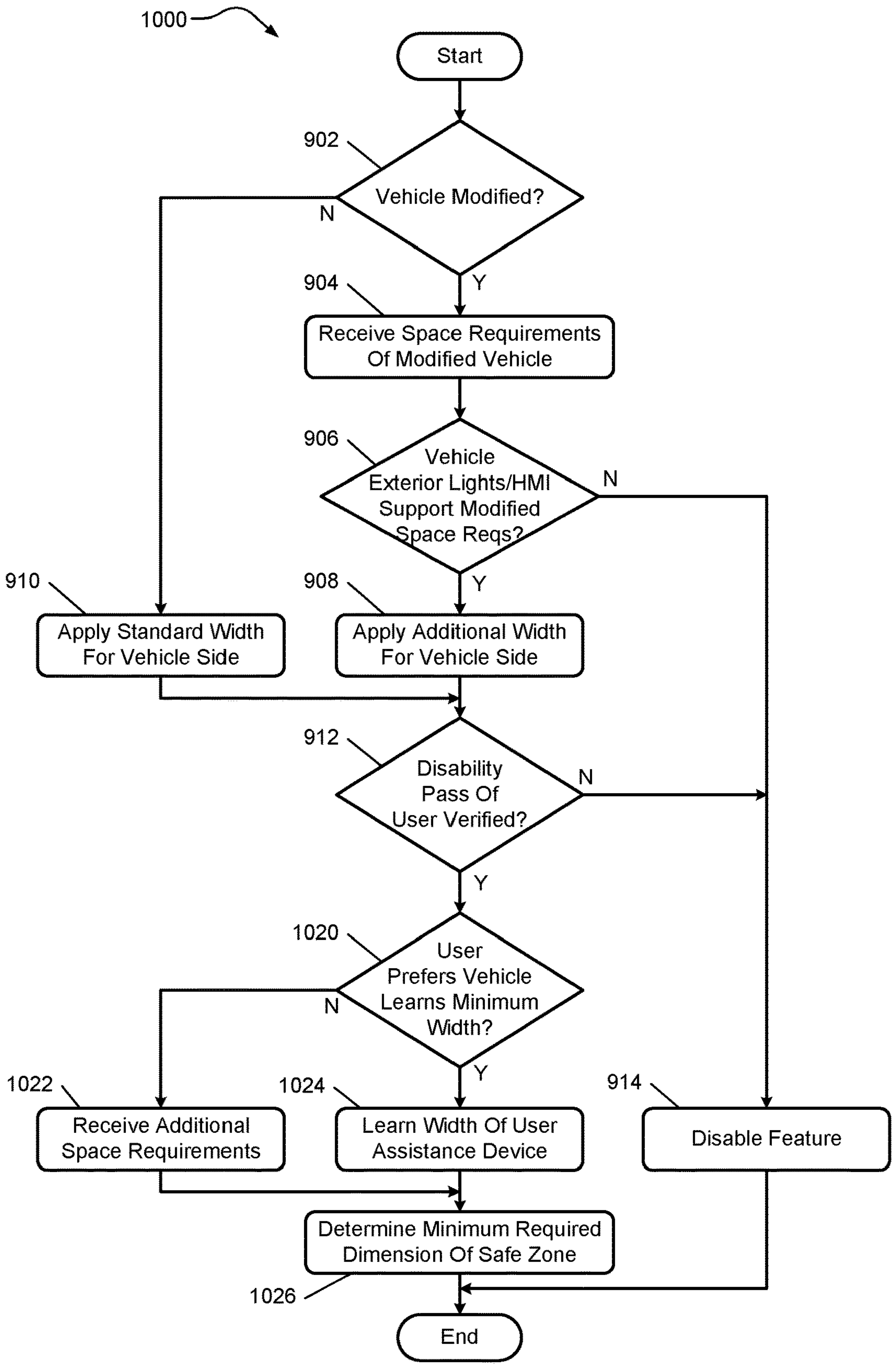
FIG. 10 is a flowchart of another example control process for determining a minimum required dimension of a safe zone specific to a user, according to the present disclosure.

The control process 1000 of FIG. 10 is employable to determine a minimum required dimension of a required space or safe zone specific to a user. The control process 1000 is similar to the control process 900 of FIG. 9, but with additional optional control features. For example, the control process 1000 of FIG. 10 includes the steps 902, 904, 906, 908, 910, 912, 914 as explained above relative the control process 900 of FIG. 9.

If the disability pass is verified at 912 (as explained above), control proceeds to 1020. At 1020, a determination is made as to whether the user prefers for the vehicle to learn any additional space requirements specific to the user. For example, the user may provide an input to the control module 102 (e.g., during a setup of the accessibility assistance feature, etc.) indicating a preference for the system to learn such additional space requirements. If no at 1020, control proceeds to 1022 where the control module 102 receives additional space requirements specific to the user as explained above relative to step 916 of FIG. 9. Otherwise, if the user prefers for the vehicle to learn any additional space requirements, control proceeds to 1024.

At 1024, the control module 102 learns additional space requirements specific to the user for the vehicle. For example, the control module 102 may learn a width of a user assistance device (e.g., a wheelchair, a walker, a ramp, a lift, etc.) as explained above. Control then proceeds to 1026 where the control module 102 determines the minimum required dimension of a required space or safe zone specific to the user, as explained above. For example, the determination may be made based on the applicable width associated with the vehicle (or modified vehicle), any additional space requirements (e.g., learned, provided by the user, etc.), etc. Control then ends.

Figure 11:
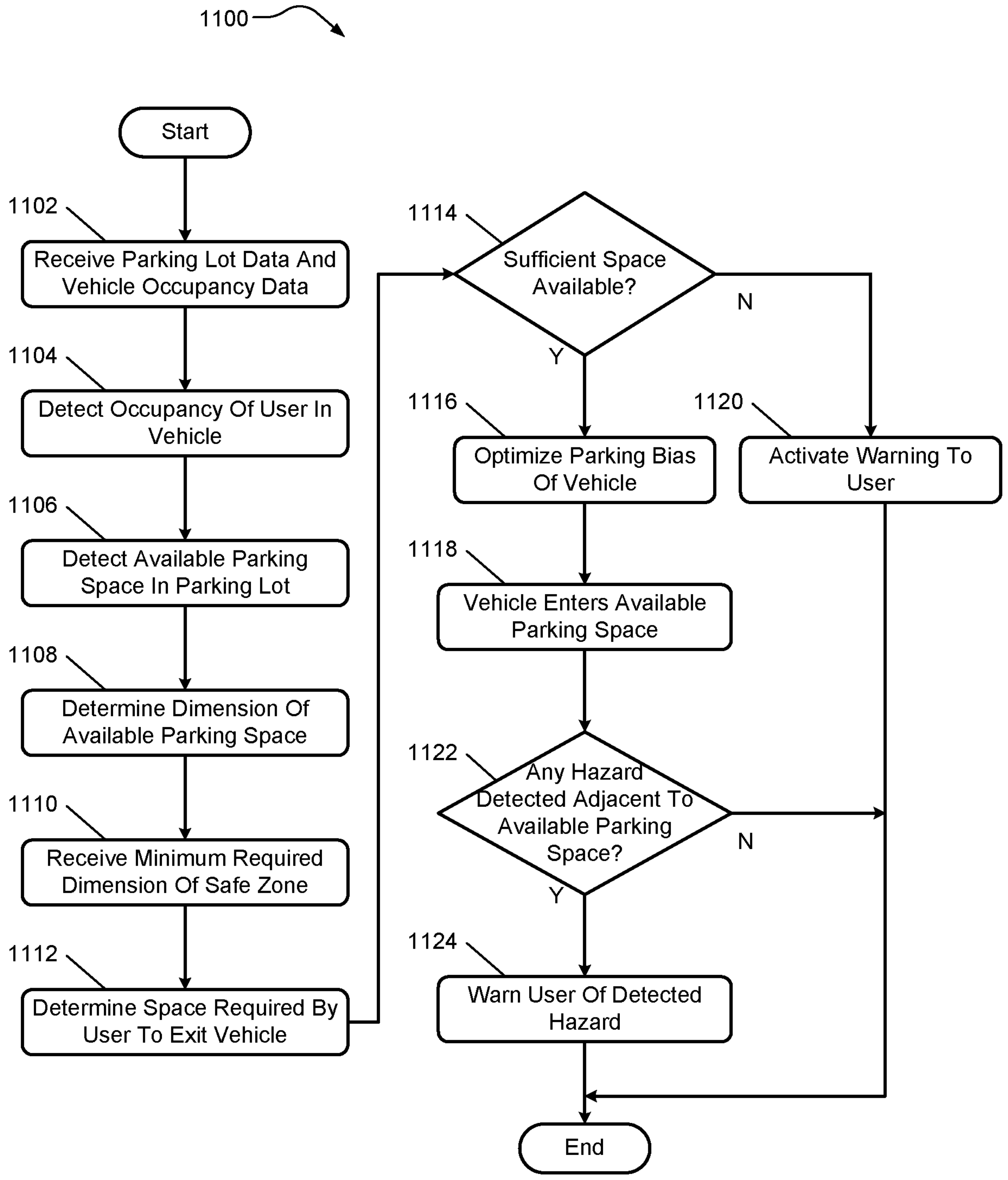
FIG. 11 is a flowchart of an example control process for assisting a user in identifying suitable parking spaces in a parking lot and exiting a vehicle, according to the present disclosure.

In FIG. 11, the control process 1100 is employable to assist the user in identifying suitable parking spaces in a parking lot and exiting the vehicle. As shown in FIG. 11, the control process 1100 begins at 1102 where the control module 102 receives parking lot data and vehicle occupancy data from, for example, the detection module 104 and the one or more occupancy sensors 112, as explained herein. Control then proceeds to 1104, 1106, 1108.

At 1104, the control module 102 detects the occupancy of the user (and other users) in the vehicle based on the vehicle occupancy data to identify a location of each user in the vehicle, as explained herein. At 1104, the control module 102 detects an available parking space in the parking lot and then at 1106, the control module 102 determines dimensions of the available parking space based on the parking lot data, as explained herein. Control then proceeds to 1110, 1112.

At 1110, the control module 102 receives a minimum required dimension associated with a required space or safe zone specific to the user, as explained herein. In some examples, the minimum required dimension may be determined as explained above relative to the control processes 900, 1000 of FIGS. 9-10. Then, at 1112, the control module 102 determines the space (e.g., the safe zone) required by the user to exit the vehicle. In some examples, the determined space may be the same as the minimum required dimension. In other examples, the determined space may be larger than the minimum required dimension. For example, the control module 102 may add a buffer (e.g., based on safety margins) to the minimum required dimension. Control then proceeds to 1114.

At 1114, the control module 102 determines whether the available parking space provides sufficient space for the user. For example, the control module 102 may compare an amount of available space in the parking space (e.g., based on the dimensions of the available parking, adjacent parking spaces and whether vehicles in the spaces are near adjoining boundaries of the identified available parking space, etc.) and the user's required space (the safe zone) to determine whether the detected available parking space provides sufficient space for the user. If no at 1114, control proceeds to 1120 where the control module 102 may activate a warning to the user to notify the user of the insufficient space, as explained herein. Control may then end as shown in FIG. 11 or return to another suitable step, such as 1102 if desired.

If, however, there is sufficient space available at 1114, control proceeds to 1116, 1118. At 1116, the control module 102 optimizes a parking bias of the vehicle relative to a boundary of the available parking space as explained herein. Then, at 1118, the vehicle enters the available parking space based on the parking bias. In various embodiments, the vehicle may be manually controlled, autonomously controlled, etc. to enter the available parking space as explained herein. Control then proceeds to 1122.

At 1122, the control module 102 detects whether a hazard is present adjacent to the available parking space based on the parking lot data from the detection module 104 as explained herein. If no, control may end as shown in FIG. 11. If yes, control proceeds to 1124 where the control module 102 may activate a warning to the user to notify the user of the hazard as explained herein. Control may then end.

Figure 12:
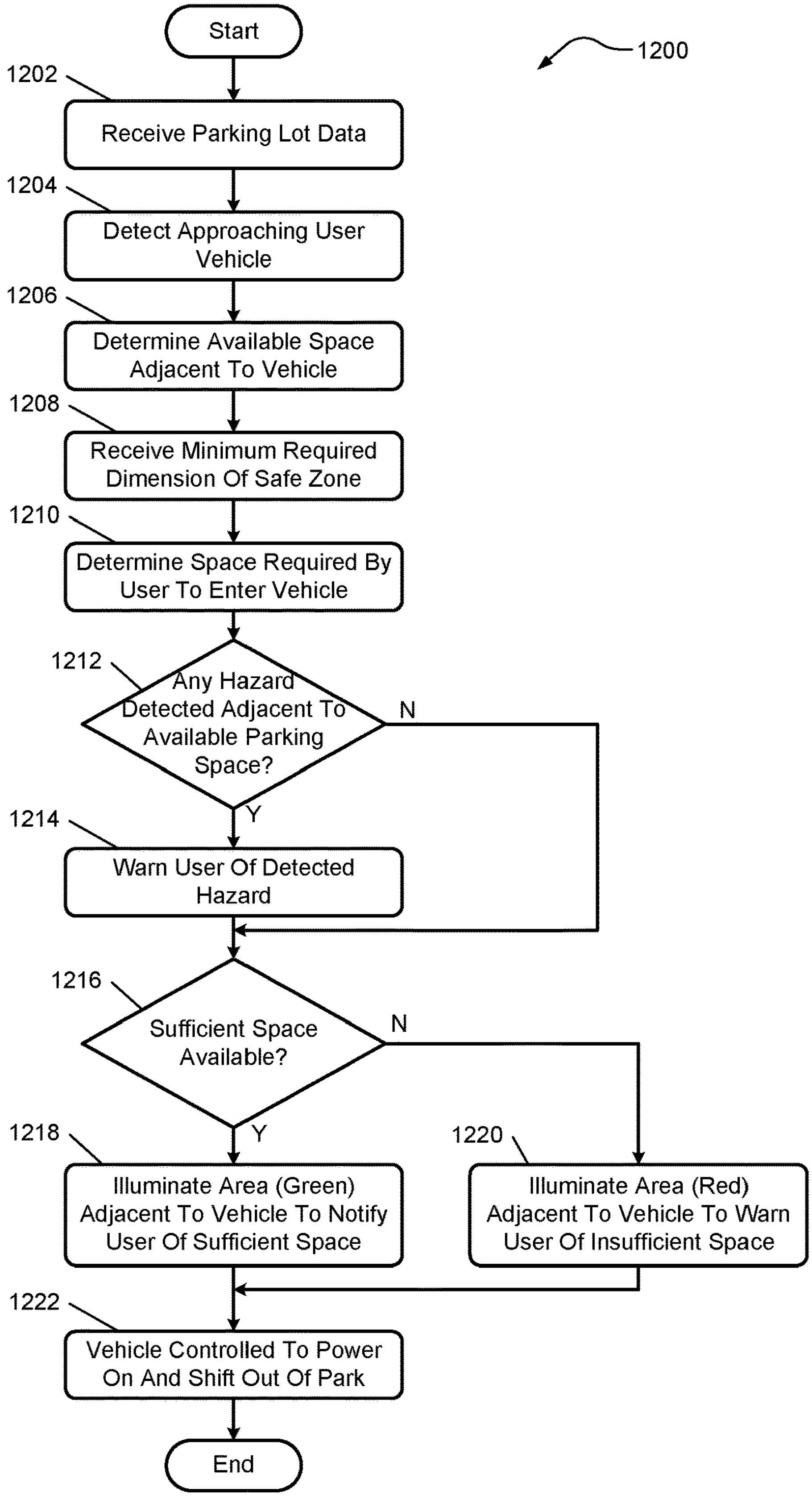
FIG. 12 is a flowchart of an example control process for assisting a user in entering a vehicle when the vehicle is parked in a parking lot, according to the present disclosure.

The control process 1200 of FIG. 12 is employable to assist the user in entering the vehicle when parked in a parking lot. As shown in FIG. 12, the control process 1200 begins at 1202 where the control module 102 receives parking lot data from, for example, the detection module 104, as explained herein. Control then proceeds to 1204.

At 1204, the control module 102 detects the user approaching the vehicle. For example, the control module 102 may detect the approaching user based on a received signal from a key fob, a user's phone, etc., as explained above. Control then proceeds to 1206, 1208, 1210.

At 1206, the control module 102 determines the available space in the parking space for the user to enter the vehicle. As explained herein, this determination may be made based on the dimensions of the available parking, adjacent parking spaces and whether vehicles in the spaces are near adjoining boundaries of the identified available parking space, etc. At 1208, the control module 102 receives a minimum required dimension associated with a required space (a safe zone) specific to the user, as explained herein. Then, at 1210, the control module 102 determines the space required by the user to enter the vehicle. For example, the determined space may be the same as the minimum required dimension or may be larger than the minimum required dimension as explained herein. Control then proceeds to 1212.

At 1212, the control module 102 detects whether a hazard is present adjacent to the available parking space based on the parking lot data from the detection module 104 as explained herein. If no, control proceeds to 1216. If yes, control proceeds to 1214 where the control module 102 may activate a warning to the user to notify the user of the hazard as explained herein. Control then proceeds to 1216.

At 1216, the control module 102 determines whether the available parking space provides sufficient space for the user. For example, the control module 102 may compare the amount of available space in the parking space and the space required by the user to enter the vehicle to determine if the available parking space provides sufficient space for the user. If no at 1216, control proceeds to 1220 where the control module 102 may illuminate (e.g., in red or another suitable color) an area adjacent to the vehicle to warn the user of the insufficient space as explained herein. Control then proceeds to 1222. If, however, the available parking space provides sufficient space for the user, control proceeds to 1218 where the control module 102 may illuminate (e.g., in green or another suitable color) an area adjacent to the vehicle to notify the user of the sufficient space as explained herein. Control then proceeds to 1222.

At 1222, the vehicle is controlled to power on and shift out of park to exit the parking space. For example, the vehicle may be manually controlled by the user to power on the vehicle and then shift the vehicle out of park and to reverse (or drive). In other examples, the vehicle may be autonomously controlled to power on and shift then shift the vehicle out of park and to reverse (or drive). Control may then end as shown in FIG. 12.

Figure 13:
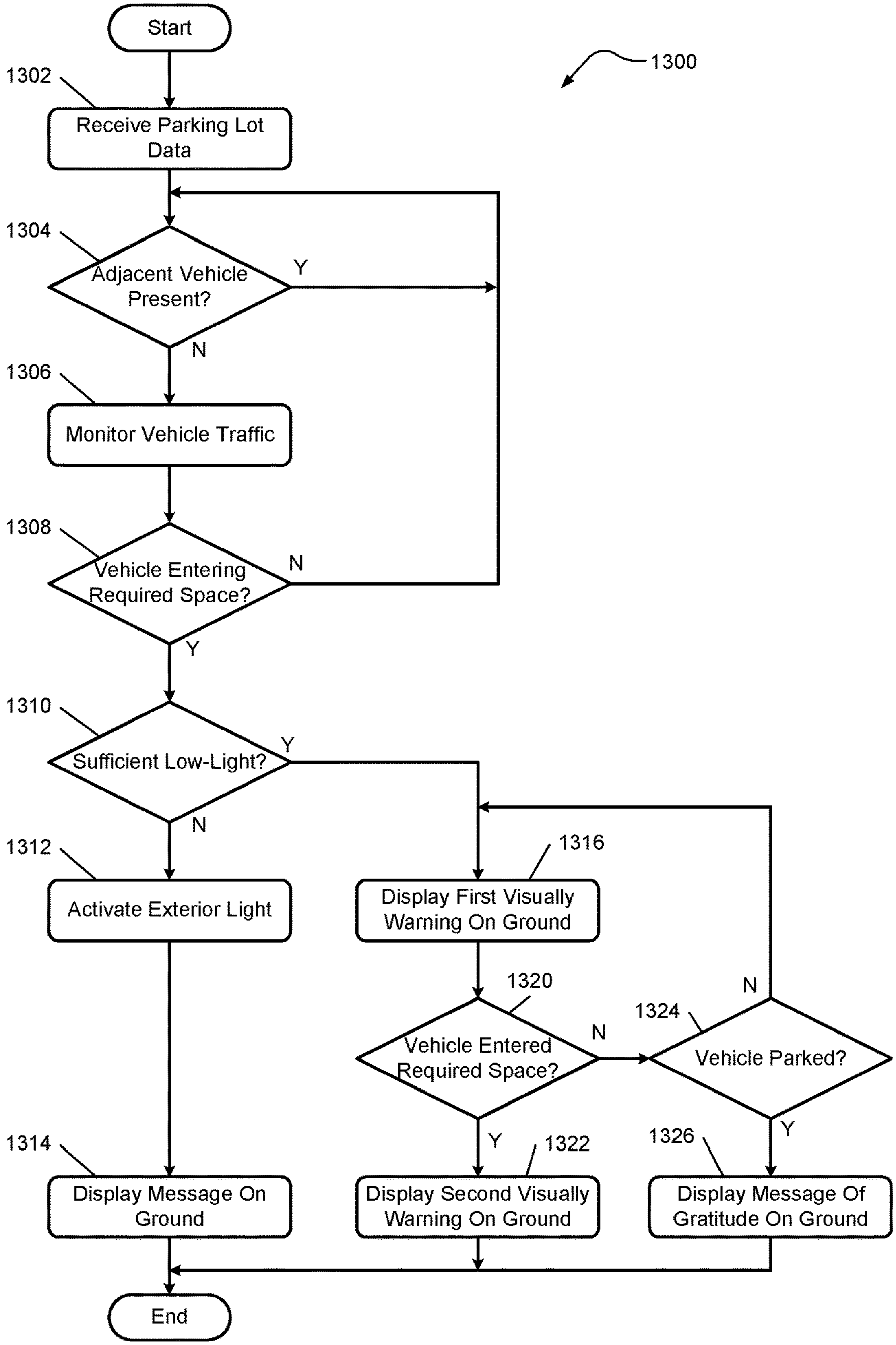
FIG. 13 is a flowchart of an example control process for communicating with users of other vehicles about extra space needs of a user associated with a parked vehicle in a parking lot, according to the present disclosure.

In FIG. 13, the control process 1300 is employable to communicate with users from other vehicles to make them aware of extra space needs of a user associated with a parked vehicle. As shown in FIG. 13, the control process 1300 begins at 1302 where the control module 102 receives parking lot data from the detection module 104, as explained herein. Control then proceeds to 1304.

At 1304, the control module 102 determines whether an adjacent vehicle is present. For example, the control module 102 may detect a vehicle in a parking space adjacent to the parked vehicle based on the parking lot data. If yes, control may return to 1304 as shown in FIG. 13. Otherwise, if there is no adjacent vehicle present at 1304, control proceeds to 1306 where the control module 102 monitors (e.g., continuously or periodically) for vehicle traffic near the parked vehicle based on the parking lot data. Control then proceeds to 1308.

At 1308, the control module 102 determines whether a vehicle is entering the required space (e.g., the safe space or zone around the vehicle) for the user. As explained above, the required space for the user is based on a determined minimum required dimension. If no at 1308, control may return to 1304 as shown in FIG. 13. If, however, the vehicle is entering the required space, control proceeds to 1310.

At 1310, the control module 102 determines whether a sufficient low-light condition is present. For example, the control module 102 may determine whether the environment around the vehicle indicates the brightness around the vehicle is adequate for different warnings (e.g., having different colors, etc.). This determination may be made based on the parking lot data from the detection module 104 (e.g., one or more visibility sensors of the detection module 104). If no at 1310, control proceeds to 1312. Otherwise, if the low-light condition is present, control proceeds to 1316.

At 1312, the control module 102 may activate one or more exterior lights of the parked vehicle. In such examples, the control module 102 may flash corner and/or side lights of the parked vehicle adjacent to the entering vehicle to warn the driver of the entering vehicle. Control then proceeds to 1314.

At 1314, the control module 102 may control one or more lights (e.g., via the illumination control module 110 and the lights 120 of FIG. 1) to display a message to the driver of the entering vehicle to make the driver aware of extra space needs of the user associated with the parked vehicle. For example, the message may include "please keep extra distance" and a wheelchair symbol. In some examples, the control module 102 may only control the lights to display the message if an exterior display is available for the parked vehicle. Control may then end as shown in FIG. 13 or return to another suitable step, such as step 1306 if desired.

At 1316, the control module 102 may control one or more lights (e.g., via the illumination control module 110 and the lights 120 of FIG. 1) to project a first visually warning on the ground to notify the driver of the entering vehicle of extra space needs of the user associated with the parked vehicle. For example, the control module 102 may visually warn the driver by illuminating in a first color (e.g., orange, etc.) an area on the ground corresponding to the space required by the user to enter or exit the parked vehicle and displaying a first message (e.g., a smiley face, a neural face, etc.) on the illuminated area. In one example, the first visually warning may include initially highlighting the required space (e.g., the safe space) with flashing exterior/underbody lights and then highlighting the required space with a solid color and projecting an overlay with a smiley and wheelchair symbol in the highlighted color. With this visually warning, the driver of the entering vehicle may decide to reposition the vehicle (e.g., further away from the parked vehicle, in another available parking space, etc.). Control then proceeds to 1320.

At 1320, the control module 102 determines that the approaching vehicle has entered the required space based on the parking lot data from the detection module 104. If so, control proceeds to 1322 where the control module 102 may control one or more lights (e.g., via the illumination control module 110 and the lights 120 of FIG. 1) to project a second visually warning on the ground. For example, the control module 102 may visually warn the driver by illuminating the area on the ground in a second color (e.g., red, etc.) and display a second message (e.g., a sad face, etc.) on the illuminated area. Control may then end as shown in FIG. 13 or return to another suitable step, such as step 1306 if desired.

If, however, the approaching vehicle has not entered the required space at 1320, control proceeds to 1324 where the control module 102 determines whether the vehicle has parked based on the parking lot data from the detection module 104. If no, control returns to 1316. If, however, the approaching vehicle has parked, control proceeds to 1326 where the control module 102 may control one or more lights (e.g., via the illumination control module 110 and the lights 120 of FIG. 1) to display a message of gratitude on the ground. For example, the message may include "thank you." Control may then end as shown in FIG. 13 or return to another suitable step, such as step 1306 if desired.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle system for assisting a user in a parking lot, the vehicle system comprising:
- a detection module configured to receive data relating to the parking lot; and
- a control module in communication with the detection module, the control module configured to:
- detect whether an available parking space is present in the parking lot based on the received data from the detection module;
- determine an amount of space required by the user to exit a vehicle;
- determine whether the available parking space provides sufficient space for the user based on the determined amount of required space; and
- in response to determining that the available parking space provides sufficient space for the user, optimize a parking bias of the vehicle relative to at least one boundary of the available parking space based on the amount of space required by the user;
- detect whether the user is approaching the vehicle parked in the parking space in the parking lot;
- determine an available space adjacent to the vehicle based on the received data from the detection module;
- determine an amount of space required by the user to enter the vehicle; and
- illuminate an area adjacent to the vehicle to notify the user of an insufficient space to enter the vehicle based on the available space adjacent to the vehicle and the amount of space required by the user to enter the vehicle.

2. The system of claim 1, wherein the control module is configured to control the vehicle to enter the available parking space based on the parking bias of the vehicle relative to the at least one boundary of the available parking space.

3. The system of claim 1, wherein the control module is configured to:

detect an occupancy of the user in the vehicle; and optimize the parking bias of the vehicle relative to the at least one boundary of the available parking space based on the amount of space required by the user and the occupancy of the user.

4. The system of claim 1, wherein the control module is configured to:

receive a minimum required dimension of a safe zone specific to the user; and determine the amount of space required by the user based on the minimum required dimension.

5. The system of claim 4, wherein the minimum required dimension of the safe zone is customizable based on at least one of a dimension of the vehicle, a modification of the vehicle, a user defined dimension, a suggested dimension, and a learned dimension of a user assistance device.

6. The system of claim 1, wherein the control module is configured to:

detect whether a hazard is present adjacent to the available parking space based on the received data from the detection module; and warn the user of the detected hazard.

7. The system of claim 6, wherein the control module is configured to warn the user of the detected hazard by at least one of illuminating the detected hazard and displaying a warning on a display module for the detected hazard.

8. The system of claim 1, wherein the control module is configured to activate a warning to the user in response to determining that the available parking space provides insufficient space for the user.

9. The system of claim 8, wherein the warning is at least one of a visual warning, an audible warning, and a haptic warning.

10. The system of claim 1, wherein the control module is configured to:

receive data indicative of a user-based rating of the parking lot and one or more characteristics of the parking lot; and display on a display module the user-based rating and the one or more characteristics of the parking lot.

11. A vehicle system for assisting a user in a parking lot, the vehicle system comprising:

a detection module configured to receive data relating to the parking lot; and a control module in communication with the detection module, the control module configured to:

detect whether the user is approaching a vehicle parked in a parking space of the parking lot;

determine an available space adjacent to the vehicle based on the received data from the detection module;

determine an amount of space required by the user to enter the vehicle;

compare the amount of space required by the user and the available space adjacent to the vehicle; and in response to the amount of space required by the user being less than the available space adjacent to the vehicle, illuminate an area adjacent to the vehicle to notify the user of a sufficient space to enter the vehicle.

12. The system of claim 11, wherein the control module is configured to detect whether a hazard is present adjacent to the vehicle based on the received data from the detection module and warn the user of the detected hazard.

13. The system of claim 12, wherein the control module is configured to warn the user of the detected hazard by illuminating the detected hazard.

14. The system of claim 11, wherein the control module is configured to:

receive a minimum required dimension of a safe zone specific to the user; and determine the amount of space required by the user based on the minimum required dimension.

15. The system of claim 14, wherein the minimum required dimension of the safe zone is customizable based on at least one of a dimension of the vehicle, a modification of the vehicle, a user defined dimension, a suggested dimension, and a learned dimension of a user assistance device.

16. A vehicle system for assisting a user in a parking lot, the vehicle system comprising:

a detection module configured to receive data relating to the parking lot; and a control module in communication with the detection module, the control module configured to:

determine an amount of space required by the user to enter or exit a first vehicle parked in a parking space of the parking lot;

detect whether a second vehicle is entering the space required by the user to enter or exit the first vehicle; and in response to the second vehicle entering the space required by the user to enter or exit the first vehicle, visually warn a driver of the second vehicle of the space required by the user to enter or exit the first vehicle.

17. The system of claim 16, wherein the control module is configured to visually warn the driver of the second vehicle by at least one of activating an exterior light of the first vehicle adjacent to the entering second vehicle and displaying a message on the ground between the first vehicle and the entering second vehicle.

18. The system of claim 16, wherein the control module is configured to visually warn the driver of the second vehicle by illuminating in a first color an area on the ground corresponding to the space required by the user to enter or exit the first vehicle and displaying a first message on the illuminated area.

19. The system of claim 18, wherein the control module is configured to:

determine whether the second vehicle has entered the space required by the user to enter or exit the first vehicle; and in response to the second vehicle being in the space required by the user to enter or exit the first vehicle, illuminate the area on the ground in a second color different than the first color and display a second message on the illuminated area different than the first message.

20. The system of claim 16, wherein the control module is configured to:

determine whether the second vehicle has entered the space required by the user to enter or exit the first vehicle; and in response to the second vehicle not being in the space required by the user to enter or exit the first vehicle, display a message of gratitude on the ground.

* * * * *